United States Patent
Lamm

(10) Patent No.: US 6,437,530 B1
(45) Date of Patent: Aug. 20, 2002

(54) METHOD FOR ELECTRONIC SURVEILLANCE AND CONTROL OF THE OPENING AND CLOSING PROCEDURE FOR ELECTRICALLY OPERATED UNITS

(75) Inventor: Hubert Lamm, Kappelrodeck (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/582,061

(22) PCT Filed: Oct. 2, 1999

(86) PCT No.: PCT/DE99/03199

§ 371 (c)(1),
(2), (4) Date: Jun. 21, 2000

(87) PCT Pub. No.: WO00/24106

PCT Pub. Date: Apr. 27, 2000

(30) Foreign Application Priority Data

Oct. 21, 1998 (DE) .......................... 198 48 468

(51) Int. Cl.$^7$ ................................. G05B 5/00
(52) U.S. Cl. .................. 318/445; 318/256; 318/461; 318/463; 318/466; 318/469; 318/465; 318/476; 388/815; 388/833; 388/903
(58) Field of Search .................. 318/256, 461, 318/463, 466, 469, 445, 465, 476; 388/815, 833, 903

(56) References Cited

U.S. PATENT DOCUMENTS

| | | | | |
|---|---|---|---|---|
| 5,764,008 A | * | 6/1998 | Hahn et al. | 318/256 |
| 5,979,114 A | * | 11/1999 | Clark et al. | 318/461 |
| 6,064,165 A | * | 5/2000 | Boisvert et al. | 318/465 |
| 6,081,654 A | * | 6/2000 | Morman et al. | 318/465 |

* cited by examiner

Primary Examiner—Karen Masih
(74) Attorney, Agent, or Firm—Kenyon & Kenyon

(57) ABSTRACT

A method for the electronic monitoring and control of the opening and closing operation of electrically operated aggregates, particularly of window lifters and sunroofs in motor vehicles, is described. A regulating unit of the aggregate is connected to a vehicle electrical system. The regulating unit is directly influenceable via electrical operating control elements, i.e., via a control-electronics interfacing circuitry connected to the aggregate. The control electronics interfacing circuitry is supplied with a signal that is a function of an accelerative force acting on a motor-vehicle body.

The signal which is a function of the accelerative force, is determined from a motor speed of the regulating unit.

11 Claims, 2 Drawing Sheets

METHOD FOR ELECTRONIC SURVEILLANCE AND CONTROL OF THE OPENING AND CLOSING PROCEDURE FOR ELECTRICALLY OPERATED UNITS

FIELD OF THE INVENTION

The present invention relates to a method for the electronic monitoring and control of the opening and closing operation of electrically operated aggregates.

BACKGROUND INFORMATION

Methods of this type are familiar. In these methods, measured values, which are causally linked to the aggregate, are transmitted via a sensor device to control electronics. For example, measurable quantities represent the rotational speed of electromotors arranged in an aggregate and the opening and closing speed of an associated regulating unit. In this context, the opening and closing operation of, for example, a window or a sunroof is controllable by electrical operating control elements and influenceable via a safety shutdown. Such a safety shutdown is intended to prevent objects or extremities from getting caught. The control is usually effected as a function of forces acting on the aggregate, that is to say, if a basic limiting value for the case of getting caught is exceeded for the movement of the associated regulating unit, then there is a shutdown, or the movement of the window lifter or the sunroof is reversed.

In certain driving situations, particularly when traveling on routes that are badly damaged, additional accelerative forces occur because of the movement of the vehicle body. To prevent misrepresentation of the forces acting on the aggregate, these accelerative forces must be detected and their influence on the safety shutdown eliminated. To do so, in German Published Patent Application No. 40 20 351, the aggregate is assigned an additional sensor element detecting the accelerative forces. However, the additional space requirements due to the installation of the sensor element and the cost of such a sensor element are disadvantageous.

SUMMARY OF THE INVENTION

The method of the present invention makes it possible to detect and eliminate the interfering accelerative forces acting on the aggregate without mounting an additional sensor element. In doing this, a signal which is a function of the accelerative force is determined from a motor speed of the electrical regulating unit.

The advantage of such an embodiment is that a sensor element, which is used to detect the motor speed of the electrical regulating unit and which is generally already provided in conventional control electronics, is also used to detect the interfering accelerative forces. This makes it possible to implement such an aggregate more cost-effectively.

BRIEF DESCRIPTION OF THE DRAWINGS

In the following, the method is described more precisely with reference to the associated drawing, in which.

DETAILED DESCRIPTION

Figure 1:
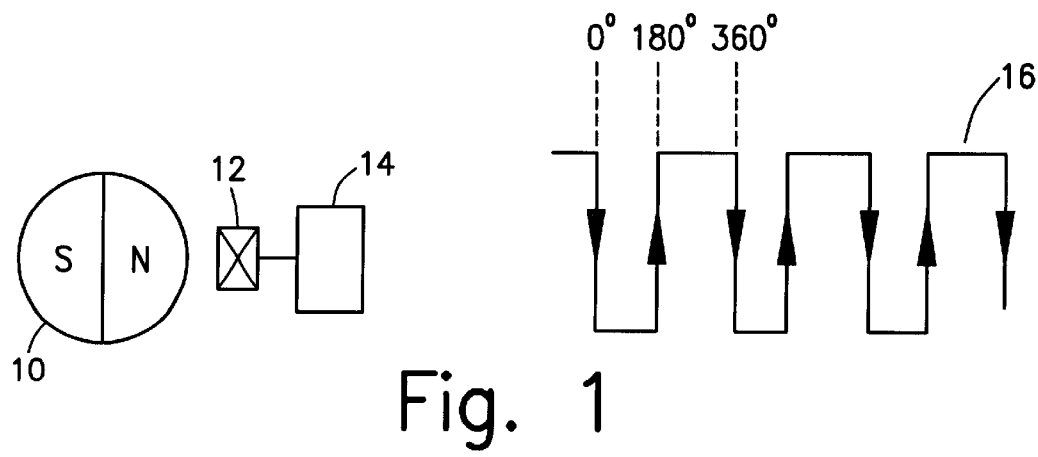
FIG. 1 shows a schematic arrangement of a sensor element for detecting a motor speed.

FIG. 1 schematically shows the detection of a motor speed 20 with the aid of a ring magnet 10 that is usually arranged on an armature shaft of an electromotor. Due to the rotation of the armature shaft, ring magnet 10 induces a signal 16 in at least one Hall-effect element 12. The signal 10 is being evaluated in a subsequent processing unit 14.

Such a signal 16 is schematically show in FIG. 1, the profile of signal 16 having negative and positive edges. Thus, starting from an angle of 0°, signal 16 initially falls off (negative edge). Signal 16 subsequently rises again at a rotational angle of 180° (positive edge). The positive and negative edges are determined by the rotation of polarized ring magnet 10. Thus, the rotational speed of the electromotor armature shaft is derivable via signal 16 supplied by Hall-effect element 12. A complete revolution of the armature shaft results in two negative edges of signal 16. The frequency of the negative edges is changed by interfering accelerative forces from the outside which affect the motor speed via a mechanical coupling of the aggregate to be actuated to the armature shaft.

Figure 2:
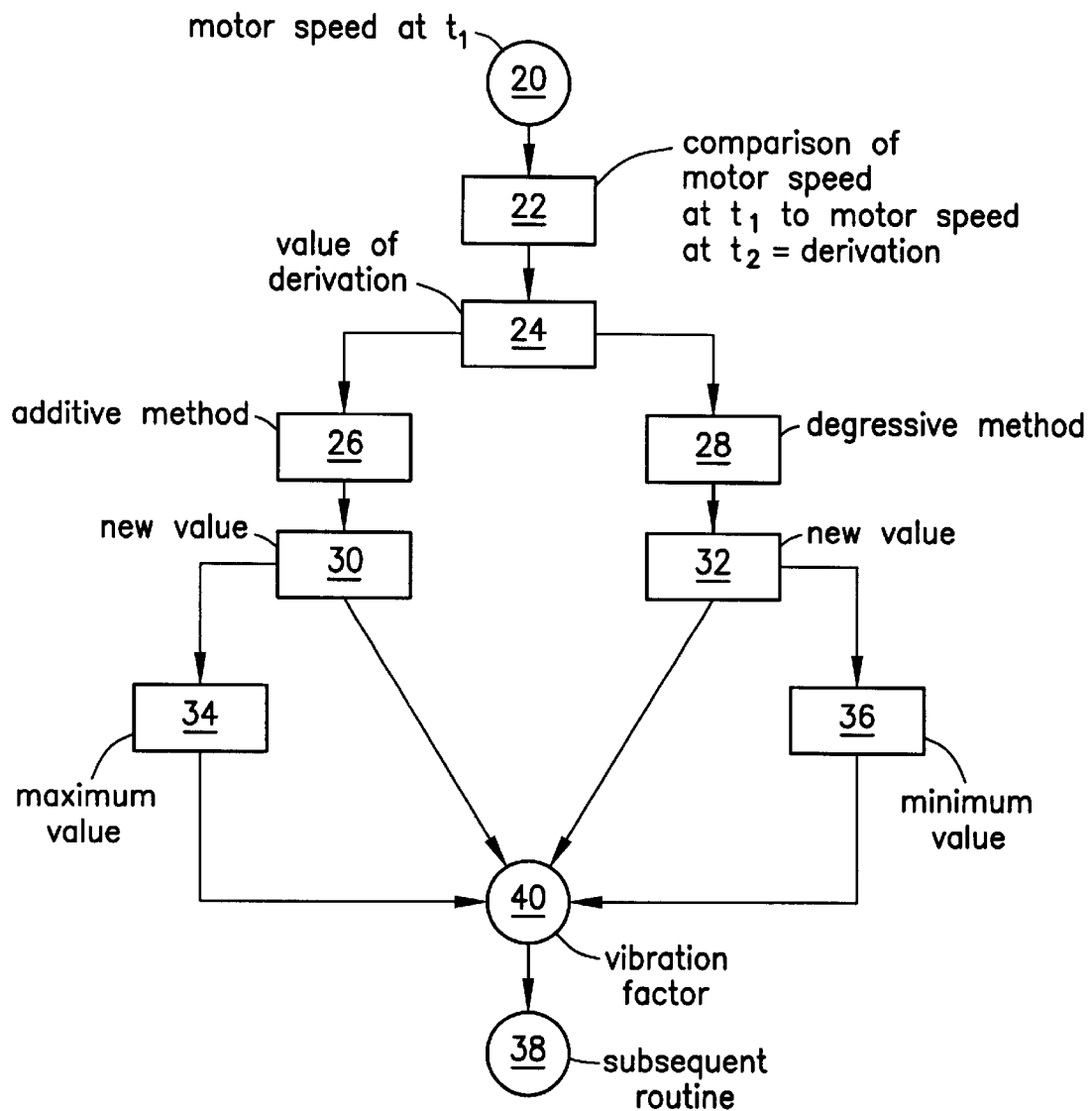
FIG. 2 shows a schematic block diagram for determining a vibration factor.

FIG. 2 shows a block diagram for determining a vibration factor 40, starting from motor speed 20 at point of time $t_1$. First, a change of motor speed 20 over time is calculated. To that end, motor speed 20 at a point of time $t_1$ is compared to motor speed 20 at a point of time $t_2$. This derivation 22 is then subsequently analyzed with respect to its magnitude and its preceding sign. In cases in which value 24 of derivation 22 is greater than 0 and exceeds a limiting value, a vibration factor 40 is set according to an additive method 26. In all other cases, vibration factor 40 is set by a degressive method 28. An additive method 26 is used when value 24 of derivation 22 is greater than 0, that is to say, that motor speed 20 is increased in this case. In addition, the setting of the limiting value permits damping of the signals, and the system noise is minimized.

Additive method 26 is carried out as follows:

An additional factor, corresponding to value 24 of derivation 22, is added onto a vibration factor 40 given from point of time $t_1$. A resulting new value 30 of vibration factor 40 is subsequently evaluated with respect to a limiting value (maximum value 34), which can be freely set, of vibration factor 40. If value 30 exceeds the limiting value, then value 30 is treated as equivalent to maximum value 34. If value 30 is less than the limiting value, then it represents the magnitude of vibration factor 40 at point of time $t_2$ and is used in a subsequent routine 38 for controlling an aggregate.

In degressive method 28, value 24 of vibration factor 40 is reduced according to a predefined correction value, and a new value 32 results for vibration factor 40. This new value 32 is in turn evaluated. In the cases in which value 32 is less than 0, value 32 is set to a minimum value 36, e.g., 0. If value 32 is greater than or equal to 0, then it represents the magnitude of vibration factor 40 at point of time $t_2$, and is subsequently used in routine 38 for controlling the aggregate.

Thus, an altered vibration factor 40 results in response to a change for a time of motor speed 20. Since the change of motor speed 20 is directly dependent on the accelerative forces acting on the aggregate which occur because of a movement of the vehicle body, the aggregate can be controlled with due consideration of such operating conditions. Vibration factor 40 is then used as a correction factor with regard to the safety shutdown of a control element of the aggregate taken into account in routine 38.

According to further exemplary embodiments, the rotational speed of the armature shaft can also be determined by rotational-speed sensors other than sensors operating according to the Hall principle. Decisive is that an acceleration-contingent change of the rotational speed of the armature shaft be detectable and evaluable.

The control of the control element is not influenced by the method during normal operation of the motor vehicle. The method starts up only when the accelerative forces have an effect as a result of poor road conditions. As soon as the accelerative force becomes less or ceases, vibration factor 40 formed is again reduced with the aid of degressive method 28.

Figure 3:
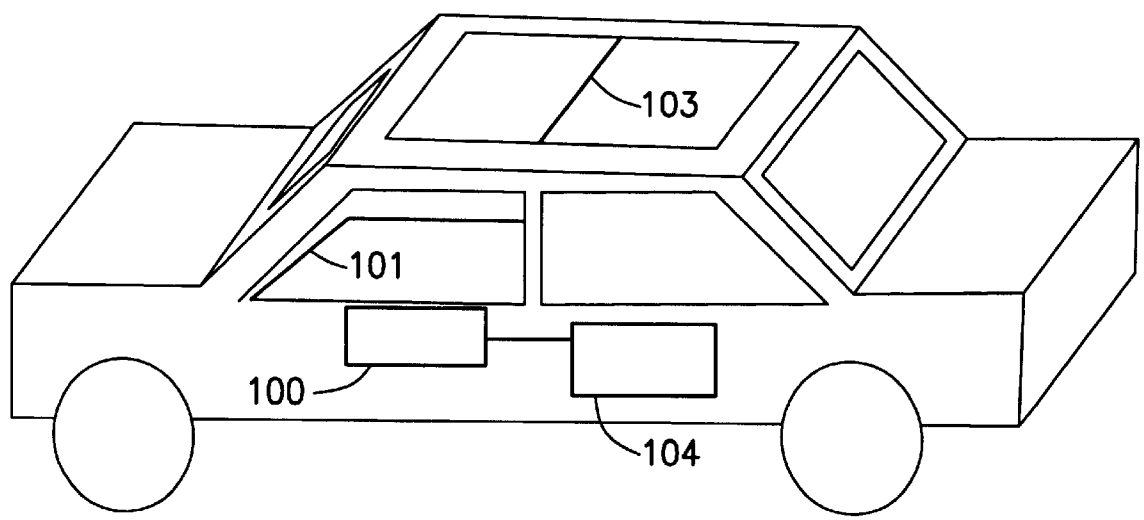
FIG. 3 shows a schematic of a motor vehicle with a window lifter and a sunroof.

FIG. 3 shows a schematic view of a motor vehicle. The motor vehicle has a window 101 with a window lifter 100. The window lifter 100 is connected to a control-electronics interfacing circuitry 104. Furthermore, there is a sunroof 103.

What is claimed is:

1. A method for electronic monitoring and control of an opening operation and a closing operation of at least one electrically operated aggregate, comprising the steps of:

controlling an electrical regulating unit of the at least one electrically operated aggregate via electrical operating control elements;

determining a signal representative of a motor speed of the electrical regulating unit, the signal being a function of an accelerative force acting on the at least one electrically operated aggregate; and supplying the signal to the electrical operating control elements.

2. The method according to claim 1, wherein:

the at least one electrically operated aggregate includes one of a window lifter and a sunroof in a motor vehicle.

3. The method according to claim 1, wherein:

the electrical operating control elements include control-electronics interfacing circuitry connected to the at least one electrically operated aggregate.

4. The method according to claim 1, further comprising the step of:

calculating a vibration factor as a function of the signal.

5. The method according to claim 4, further comprising the step of:

controlling a safety shutdown of the electrical regulating unit as function of the vibration factor.

6. The method according to claim 4, further comprising the step of:

reducing the vibration factor when the acceleration factor is smaller than a threshold;

increasing the vibration factor when the acceleration factor is greater than the threshold; and employing the vibration factor as a correction factor for a security shut-off of the electrical regulating unit.

7. The method according to claim 4, further comprising the step of:

increasing the vibration factor using an additive operation when the accelerative force increases.

8. The method according to claim 4, wherein:

the vibration factor is between a maximum value and a minimum value.

9. The method according to claim 1, further comprising the step of:

calculating a vibration factor as a function of the signal only if the signal is greater than a limiting value.

10. The method according to claim 1, further comprising the step of:

determining the motor speed using a rotational-speed sensor.

11. The method according to claim 10, wherein:

the rotational-speed sensor includes:

a ring magnet arranged on an armature shaft of a motor; and at least one Hall-effect element.

* * * * *

UNITED STATES PATENT AND TRADEMARK OFFICE
CERTIFICATE OF CORRECTION

PATENT NO.    : 6,437,530 B1
DATED         : August 20, 2002
INVENTOR(S)   : Hubert Lamm It is certified that error appears in the above-identified patent and that said Letters Patent is hereby corrected as shown below:

Column 2,
Line 3, change "signal 10" to -- signal 16 --.
Line 6, change "show" to -- shown --.

Signed and Sealed this

Sixteenth Day of September, 2003

JAMES E. ROGAN
*Director of the United States Patent and Trademark Office*